United States Patent
Nakagawa et al.

(10) Patent No.: US 7,164,340 B2
(45) Date of Patent: Jan. 16, 2007

(54) TRANSFORMER FOR SWITCHING POWER SUPPLY

(75) Inventors: Jun Nakagawa, Ozu (JP); Kenji Kawataka, Saijo (JP); Akeyuki Komatsu, Saijo (JP)

(73) Assignee: Matsushita Electric Industrial Co., Ltd. (JP)

( * ) Notice: Subject to any disclaimer, the term of this patent is extended or adjusted under 35 U.S.C. 154(b) by 8 days.

(21) Appl. No.: 11/111,741

(22) Filed: Apr. 22, 2005

(65) Prior Publication Data

US 2005/0237143 A1 Oct. 27, 2005

(30) Foreign Application Priority Data

Apr. 23, 2004 (JP) ............... 2004-127832

(51) Int. Cl.
*H01F 17/04* (2006.01)
(52) U.S. Cl. ...................... 336/212; 336/172
(58) Field of Classification Search ........... 336/172, 336/212, 83; 363/16
See application file for complete search history.

(56) References Cited

U.S. PATENT DOCUMENTS 4,004,251 A * 1/1977 Hesler et al. ............ 331/113 A
4,328,458 A * 5/1982 Hiromitsu ................ 323/251
6,873,237 B1 * 3/2005 Chandrasekaran et al. .... 336/83
2004/0239464 A1 * 12/2004 Mihara et al. .............. 336/83

FOREIGN PATENT DOCUMENTS

JP 05205952 A * 8/1993
JP 2000-134926 5/2000

* cited by examiner

*Primary Examiner*—Anh Mai
(74) *Attorney, Agent, or Firm*—Steptoe & Johnson LLP

(57) ABSTRACT

A transformer is constituted of an inner core, a plurality of outer cores connected in a ring to the inner core, a primary winding which is fed with a high frequency wave and wound around the inner core, and a secondary winding wound outside the primary winding. The secondary winding has, for the two outer cores, windings which are caused to pass at least once between the inner core and each of the respective outer cores, and the windings passed in the same direction are connected in parallel. With this configuration, it is possible to achieve a transformer for a switching power supply with a low voltage regulation.

8 Claims, 6 Drawing Sheets

TRANSFORMER FOR SWITCHING POWER SUPPLY

FIELD OF THE INVENTION

The present invention relates to a transformer for a switching power supply, the transformer having a winding of a conductive wire which is wound around a core a fractional number of times.

BACKGROUND OF THE INVENTION

The following will describe a conventional transformer for a switching power supply and a switching power supply using the transformer. FIG. 7 is a circuit diagram showing the switching power supply. In FIG. 7, reference numeral 1 denotes a power supply transformer and reference numeral 2 denotes a primary winding which is wound around a core 3 of the power supply transformer 1 ten times. Reference numeral 4 denotes a secondary winding which is wound outside the primary winding 2.

Reference numeral 5 denotes a 60V direct-current power supply which is connected to a terminal 2a of the primary winding 2. The other terminal 2b is connected to the drain terminal of a transistor 6, and the source terminal of the transistor 6 is connected to the ground.

Reference numeral 7 denotes an input terminal to which an oscillation signal of 40 kHz is inputted. The input terminal 7 is connected to the gate of the transistor 6.

A start terminal 4a of the secondary winding 4 is connected to the ground and aground terminal 8. An intermediate terminal 4b of the secondary winding 4 is connected to the anode side of a diode 9, and the cathode side of the diode 9 is connected to a 12V terminal 10. The cathode side of the diode 9 is connected to the ground via a capacitor 11.

The intermediate terminal 4b of the secondary winding 4 is connected to an end terminal 4c via a 0.5-turn (½ turn) winding 4d. The end terminal 4c is connected to the anode side of a diode 12, and the cathode side of the diode 12 is connected to a 15V terminal 13. The cathode side of the diode 12 is connected to the ground via a capacitor 14.

In this configuration, a wire is wound twice between the start terminal 4a and the intermediate terminal 4b of the secondary winding 4 and a wire 4d is wound 0.5 times between the intermediate terminal 4b and the end terminal 4c.

The following will discuss the operations of the switching power supply configured thus. The primary winding 2 of the power supply transformer 1 has a wire wound ten times and a voltage of 60 V is applied to the primary winding. A power supply applied to the primary winding 2 is turned on/off by the transistor 6 at a frequency of 40 KHz. In other words, the power supply is converted into a high frequency power supply of 40 KHz.

Thus, due to electromagnetic induction, a pulse voltage of 12 V is induced between the start terminal 4a and the intermediate terminal 4b of the secondary winding 4. The wire is wound twice between the start terminal 4a and the intermediate terminal 4b. Then, the voltage is half-wave rectified by the diode 9, smoothed by the capacitor 11, and outputted as a 12V direct-current power supply to the 12V terminal 10.

Further, a pulse voltage of 3 V is induced between the intermediate terminal 4b and the end terminal 4c of the secondary winding 4. That is, a pulse voltage of 15 V is induced between the start terminal 4a and the end terminal 4c. Similarly, the voltage is half-wave rectified by the diode 12, smoothed by the capacitor 14, and outputted as a 15V direct-current power supply to the 15V terminal 13.

The power supply transformer 1 will be discussed below. FIG. 8 is a sectional view showing the power supply transformer 1 from the front. In FIG. 8, reference numeral 3 denotes the core formed of soft iron. The core 3 is composed of an inner core 3a and outer cores 3b and 3c which are connected in a ring to the inner core 3a and formed symmetrically with respect to the inner core 3a.

First, the primary winding 2 is wound around the inner core 3a, and the terminals 2a and 2b are drawn (FIG. 7) from both ends of the primary winding 2. Further, the secondary winding 4 is wound outside the primary winding 2 via an insulating layer 15. The secondary winding 4 is first wound twice between the start terminal 4a and the intermediate terminal 4b, and the 0.5-turn winding 4d is wound between the intermediate terminal 4b and the end terminal 4c.

As shown in FIG. 8, the 0.5-turn winding 4d passes between the inner core 3a and the outer core 3b from the front to the back. In other words, as shown in FIG. 9, the winding 4d passes only between the inner core 3a and the outer core 3b but does not pass between the inner core 3a and the outer core 3c. The 0.5-turn winding 4d is formed in this manner.

For example, as information on prior art documents relating to the invention of this application, patent document (Japanese Patent Laid-Open No. 2000-134926) is known.

DISCLOSURE OF THE INVENTION

However, in the conventional transformer for a switching power supply, the 0.5-turn winding 4d only passes between the inner core 3a and the outer core 3b but does not pass between the inner core 3a and the outer core 3c, so that a balance is not maintained. To be specific, in FIG. 7, a load imbalance occurs between a magnetic flux 16a passing between the inner core 3a and the outer core 3b and a magnetic flux 16b passing between the inner core 3a and the outer core 3c, so that a voltage induced on the secondary winding 4 fluctuates with a load.

As a solution, a one-turn wiring may be used instead of the 0.5-turn winding 4d of the secondary winding 4. However, in this solution, a voltage and the number of turns are directly proportional to each other in the transformer and thus the primary winding 2 and the secondary winding 4 have to be doubled in the number of turns. In this case, the transformer 1 increases in size.

The present invention is devised to solve the problem. An object of the present invention is to provide a transformer for a switching power supply whereby voltage fluctuations are reduced with almost the same shape.

In order to attain the object, in a transformer for a switching power supply of the present invention, a secondary winding has, for all of two or more outer cores, windings which are caused to pass at least once between an inner core and each of the respective outer cores, and the windings passed in the same direction are connected in parallel. With this configuration, it is possible to achieve a transformer for a switching power supply whereby voltage fluctuations are reduced with almost the same shape.

The present invention is a transformer having a winding of a conductive wire which is wound around a core a fractional number of times. The transformer is used for a switching power supply and comprises an inner core, a plurality of outer cores connected in a ring to the inner core, a primary winding which is fed with a high frequency wave and wound around the inner core, and a secondary winding wound while being insulated from the primary winding, wherein the secondary winding has, for all of the two or more outer cores, windings which are caused to pass at least once between the inner core and each of the respective outer cores, and the windings passed in the same direction are connected in parallel. For all of the two or more outer cores, the secondary winding is caused to pass at least once between the inner core and each of the respective outer cores, so that the loads of magnetic fluxes passing though all the outer cores are made equal and kept in balance. Therefore, it is possible to achieve a transformer for a switching power supply whereby voltage fluctuations are small with high stability even when a load fluctuates.

Further, since the wirings passed in the same direction are connected in parallel, an outputted voltage is equal to a voltage induced on one of the windings passed in the same directions. That is, it is not necessary to multiply the number of turns of the primary winding and the secondary winding by an integer but a fractional number of turns are made. Hence, it is not necessary to change the number of turns of other windings, thereby reducing the size of the power supply transformer. Moreover, a light weight and low cost can be achieved.

In the transformer for a switching power supply, the number of outer cores is two, and half-turn winding is provided. Thus, it is possible to achieve a transformer for a switching power supply which has half-turn winding with a small size, small fluctuations in voltage, and high stability.

In the transformer for a switching power supply, the number of outer cores is three, and ⅓-turn winding is provided. Thus, it is possible to achieve a transformer for a switching power supply which has ⅓-turn winding with a small size, small fluctuations in voltage, and high stability.

In the transformer for a switching power supply, the number of outer cores is n, and 1/n-turn winding is provided. Thus, it is possible to achieve a transformer for a switching power supply which has 1/n-turn winding with a small size, small fluctuations in voltage, and high stability.

In the transformer for a switching power supply, the two or more outer cores are all identical in shape in cross section. Since the outer cores are all identical in shape in cross section, all magnetic resistances are made equal and an output is stabilized against fluctuations in load.

In the transformer for a switching power supply, the inner core has a cross-sectional area equal to or larger than the sum of the cross-sectional areas of all the outer cores. The inner core and the outer cores are made equal in magnetic flux density, so that the magnetic resistances are made equal and the output is stabilized against fluctuations in load.

Since the transformer for a switching power supply is used for a switching power supply, it is possible to achieve a switching power supply whereby voltage fluctuations are small with high stability even when a load fluctuates.

Since the power supply transformer is reduced in size, the switching power supply can be also reduced in size. Moreover, a light weight and low cost can be obtained.

As described above, according to the present invention, for all of two or more outer cores, a secondary winding is caused to pass at least once between an inner core and each of the respective outer cores. Thus, loads to the magnetic fluxes passing thorough all the outer cores are made equal and kept in balance. Therefore, it is possible to obtain a transformer for a switching power supply whereby voltage fluctuations are small with high stability even when a load fluctuates.

Since the windings passed in the same direction are connected in parallel, an outputted voltage is equal to a voltage induced on one of the windings passed in the same directions. In other words, it is not necessary to multiply the number of turns of the primary winding and the secondary winding by an integer but a fractional number of turns are made. Hence, it is not necessary to change the number of turns of other windings, thereby reducing the size of the power supply transformer. Moreover, a light weight and low cost can be obtained.

The transformer for a switching power supply of the present invention has a low voltage regulation on the secondary side and thus the transformer can be used for a switching power supply.

DESCRIPTION OF THE EMBODIMENTS (Embodiment 1)

Figure 2:
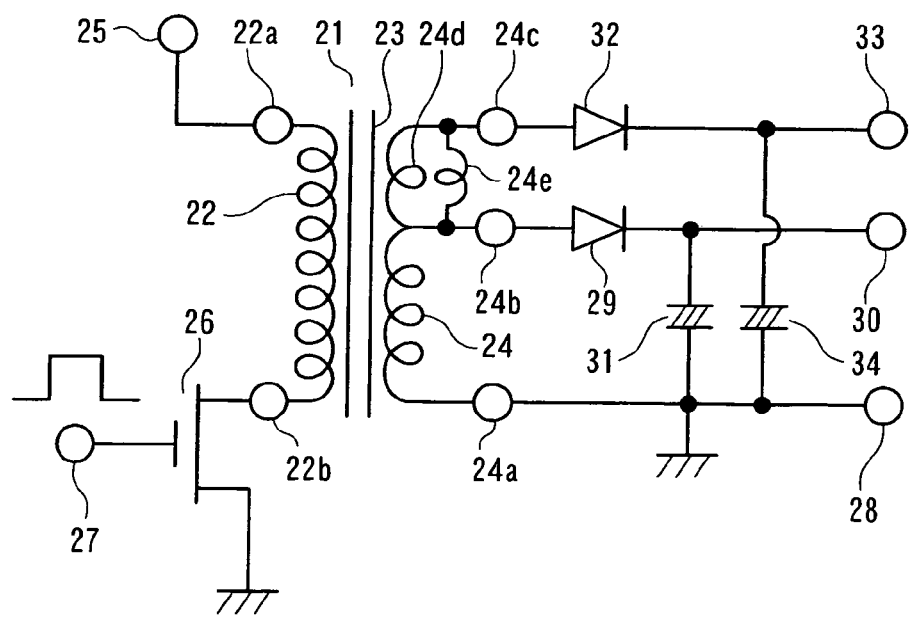
FIG. 2 is a circuit diagram showing the switching power supply of Embodiment 1.

The following will describe embodiments of the present invention in accordance with the accompanying drawings. FIG. 2 is a circuit diagram showing a switching power supply of Embodiment 1. In FIG. 2, reference numeral 21 denotes a power supply transformer. Reference numeral 22 denotes a primary winding which is wound around a core 23 of the power supply transformer 21 and is composed of a copper wire wound ten times. Reference numeral 24 denotes a secondary winding which is wound outside the primary winding 22. The secondary winding 24 may be wound inside the primary winding 22.

Reference numeral 25 denotes a 60V direct-current power supply which is connected to a terminal 22a of the primary winding 22. The other terminal 22b is connected to the drain terminal of a transistor 26, and the source terminal of the transistor 26 is connected to the ground.

Reference numeral 27 denotes an input terminal to which an oscillation signal of 40 KHz is inputted. The input terminal 27 is connected to the gate of the transistor 26. In this case, the oscillation frequency can be set at a frequency of about 1 KHz to 500 KHz. In the present embodiment, the oscillation frequency is set at 40 KHz.

A start terminal 24a of the secondary winding 24 is connected to the ground and a ground terminal 28. An intermediate terminal 24b of the secondary winding 24 is connected to the anode side of a diode 29, and the cathode side of the diode 29 is connected to a 12V terminal 30. The cathode side of the diode 29 is also connected to the ground via a capacitor 31.

From the intermediate terminal 24b of the secondary winding 24, 0.5-turn (½ turn) windings 24d and 24e are connected in parallel to an end terminal 24c. The end terminal 24c is connected to the anode side of a diode 32, and the cathode side of the diode 32 is connected to a 15V terminal 33. The cathode side of the diode 32 is also connected to the ground via a capacitor 34.

In this configuration, a wire (copper wire) is wound twice between the start terminal 24a and the intermediate terminal 24b of the secondary winding 24 and wires (copper wires) 24d and 24e are wound 0.5 times and connected in parallel between the intermediate terminal 24b and the end terminal 24c.

The following will discuss the operations of the switching power supply configured thus. The primary winding 22 of the power supply transformer 21 is composed of the wire wound ten times and a voltage of 60 V is applied to the primary winding. A power supply applied to the primary winding 22 is turned on/off by the transistor 26 at a frequency of 40 KHz. In other words, the power supply is converted into a high frequency power supply of 40 KHz. At a high frequency of about 20 KHz to 500 KHz, a sufficient impedance can be obtained even by a winding of about ten turns.

Thus, since the voltage of the transformer 21 is directly proportional to the windings, a pulse voltage of 12 V is induced between the start terminal 24a and the intermediate terminal 24b of the secondary winding 24 due to electromagnetic induction. The wire is wound twice between the start terminal 24a and the end terminal 24c. Then, the voltage is half-wave rectified by the diode 29, smoothed by the capacitor 31, and outputted as a 12V direct-current power supply to the 12V terminal 30.

The windings 24d and 24e are wound 0.5 times between the intermediate terminal 24b and the end terminal 24c of the secondary winding 24, and thus a pulse voltage of 3 V is induced therebetween. That is, a pulse voltage of 15 V is induced between the start terminal 24a and the end terminal 24c. Then, the voltage is half-wave rectified by the diode 32, smoothed by the capacitor 34, and outputted as a 15V direct-current power supply to the 15V terminal 33.

Figure 3:
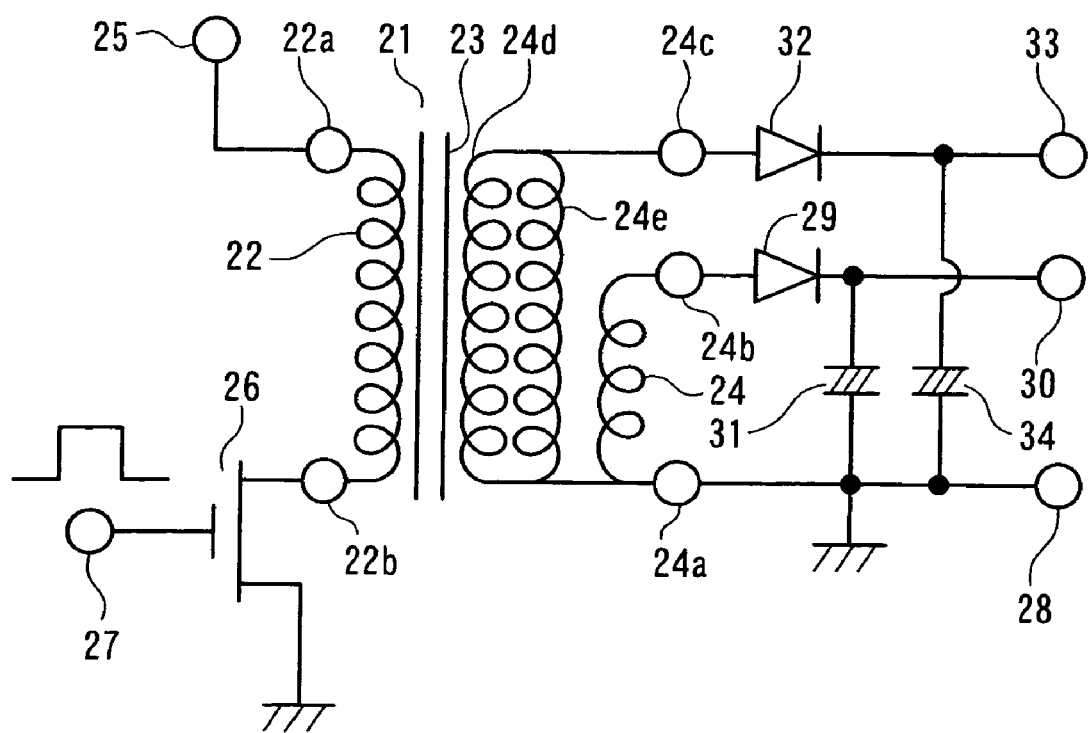
FIG. 3 is a circuit diagram showing another switching power supply of Embodiment 1.

In FIG. 2, the winding 24d and the winding 24e are wound 0.5 times from the secondary winding 24. As shown in FIG. 3, the winding 24d and the winding 24e may be wound from the start terminal 24a separately from the winding 24. In this case, the winding 24d and the winding 24e have 2.5 T (5/2). Thus, it is possible to effectively reduce the influence on the 15V terminal 33, the concentration of a load current on the winding 24, and a temperature increase on the winding when the load of the 12V terminal 30 fluctuates. With this configuration, it is possible to obtain a voltage required for the 15V terminal 33. This configuration is applicable even with m+(1/n) turns.

Figure 4A:
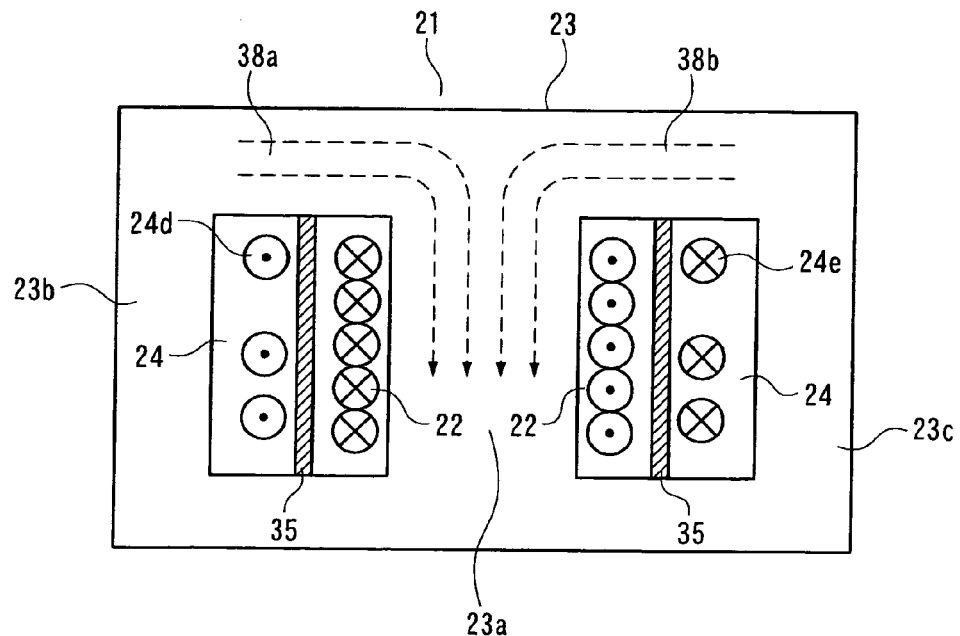
FIGS. 4A and 4B are sectional front views showing the transformer for the switching power supply according to Embodiment 1.
Figure 4B:
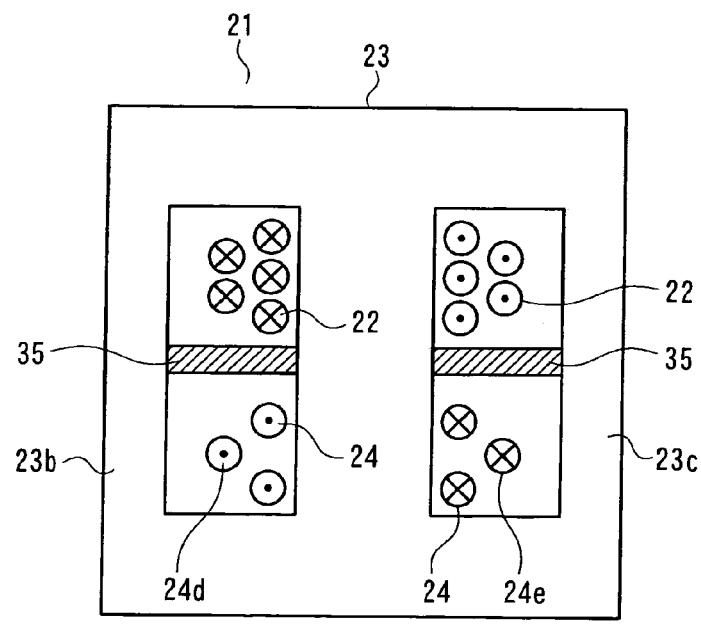

The transformer 21 will be discussed below. FIGS. 4A and 4B are sectional views showing the transformer 21 from the front. FIG. 4A shows the primary winding and the secondary winding in a laminated structure. FIG. 4B shows the windings in a divided structure. FIGS. 4A and 4B are similar in configuration to each other and thus will be referred to as FIG. 4 in the following explanation. In FIG. 4, reference numeral 23 denotes the core formed of soft iron. The core 23 is composed of an inner core 23a and outer cores 23b and 23c which are connected in a ring to the inner core 23a. The outer cores 23b and 23c are disposed symmetrically (in directions different by 180°) with respect to the inner core 23a.

First, the primary winding 22 is wound around the inner core 23a, and the terminals 22a and 22b are drawn (FIG. 2) from both ends of the primary winding 22. Further, the secondary winding 24 is wound outside the primary winding 22 via an insulating layer 35. The secondary winding 24 is first wound twice between the start terminal 24a and the intermediate terminal 24b, and the two 0.5-turn windings 24d and 24e are connected in parallel between the intermediate terminal 24b and the end terminal 24c.

Figure 1:
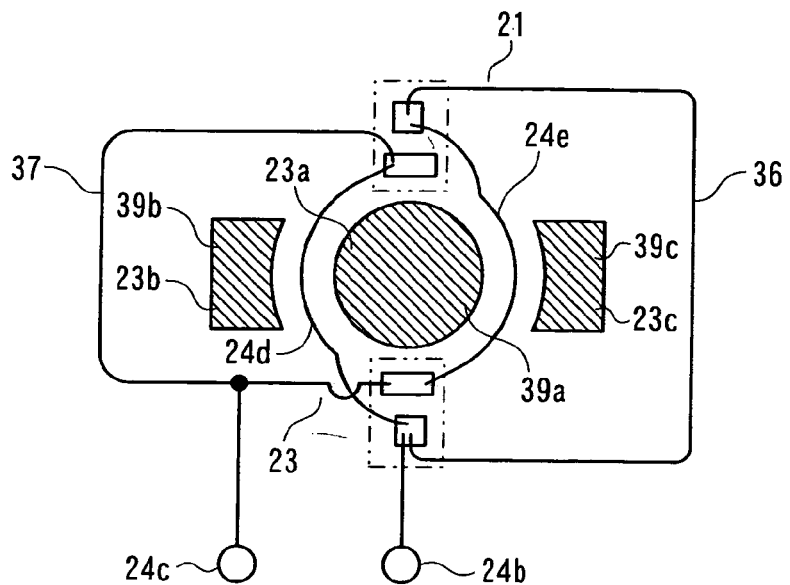
FIG. 1 is a sectional top plan view showing the main part of a transformer for a switching power supply according to Embodiment 1 of the present invention.

As shown in FIGS. 1 and 4, of the 0.5-turn windings 24d and 24e, the winding 24d is wound between the inner core 23a and the outer core 23b and the winding 24e is wound between the inner core 23a and the outer core 23c. Further, the start terminal of the winding 24d and the start terminal of the winding 24e are connected to each other via a conductor 36 outside the core 23, and drawn to the terminal 24b. Moreover, the end terminal of the winding 24d and the end terminal of the winding 24e are connected to each other via a conductor 37 outside the core 23, and drawn to the terminal 24c.

In this way, the 0.5-turn winding 24d passes through the core 23 from the front to the back and the 0.5-turn winding 24e passes through the core 23 from the back to the front. To be specific, the winding 24d passes between the inner core 23a and the outer core 23b and the winding 24e passes between the inner core 23a and the outer core 23c. Further, the windings 24d and 24e in the same direction are connected in parallel. Therefore, the windings 24d and 24e are equal in induced voltage and are connected in parallel.

Hence, an induced voltage between the intermediate terminal 24b and the end terminal 24c is equivalent to a 0.5-turn winding and evenly affects a magnetic flux 38a and a magnetic flux 38b of FIG. 4. Since the magnetic fluxes 38a and 38b are kept in balance, the voltage regulation of an output improves.

Figure 5:
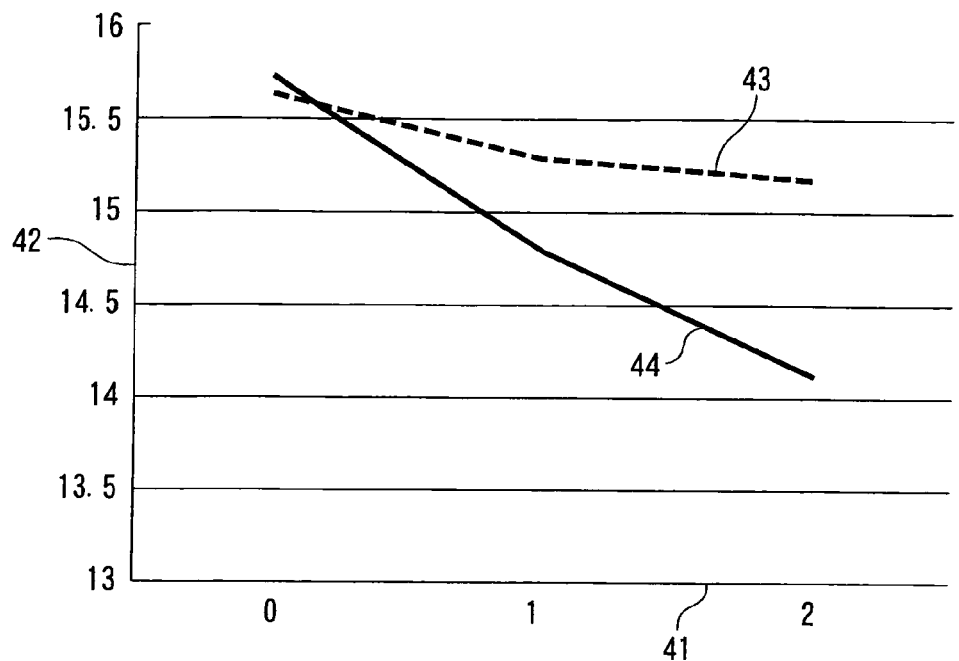
FIG. 5 is a diagram showing a characteristic curve according to Embodiment 1.

FIG. 5 shows a characteristic curve of an output voltage relative to an output current. In FIG. 5, a horizontal axis 41 represents an output current (A) and a vertical axis 42 represents an output voltage (V). Reference numeral 43 denotes the characteristic curve of the present invention, and reference numeral 44 denotes a characteristic curve obtained using a conventional transformer 1. As indicated by the characteristic curves, the voltage of the conventional transformer is 14.2 V at a load of 2 A and the voltage drops by about 9.6% from 15.7 V at no load, whereas in the present embodiment, the voltage of the transformer is 15.3 V at a load of 2 A and the voltage drops by about 2.0% from 15.6 V at no load. Thus, it is found that the voltage regulation is considerably reduced in the present embodiment.

Even when a single-turn (doubled) winding is used instead of the 0.5-turn winding, the magnetic fluxes 38a and 38b can be kept in balance, thereby reducing a voltage regulation as in the present embodiment. However, in this case, the voltages of the primary winding 22 and the secondary winding 24 are proportionate to the number of turns and thus it is necessary to double the number of turns. To be specific, 20 turns are necessary between the terminal 22a and the terminal 22b of the primary winding 22, and four turns are necessary between the start terminal 24a and the intermediate terminal 24b of the secondary winding 24. Therefore, the power supply transformer 21 increases in size and weight.

It is desirable that the outer cores 23b and 23c be identical in shape in cross section. With this configuration, all magnetic resistances are made equal and an output is stabilized against load fluctuations.

Further, it is desirable that a cross-sectional area 39a of the inner core 23a be equal to or larger than the sum of a cross-sectional area 39b of the outer core 23b and a cross-sectional area 39c of the outer core 23c. With this configuration, the magnetic fluxes of the inner core 23a and the outer cores 23b and 23c become equal, so that the magnetic resistances become equal and the output is stabilized against load fluctuations.

(Embodiment 2)

Figure 6:
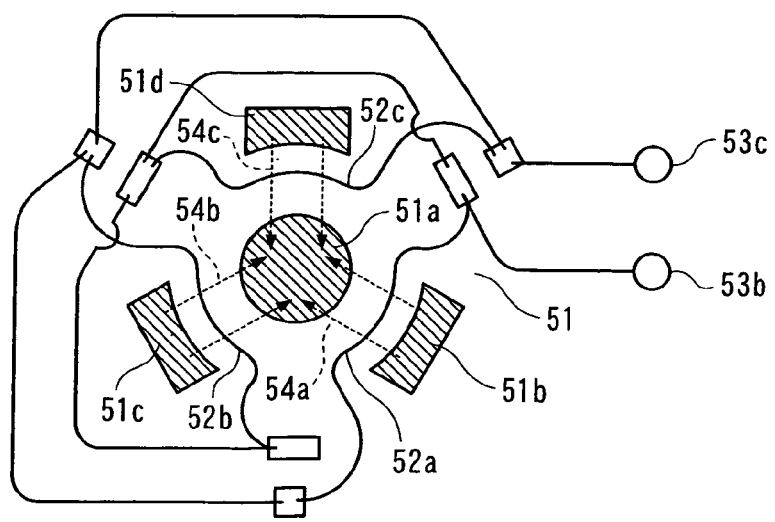
FIG. 6 is a sectional top plan view showing the main part of a transformer for a switching power supply according to Embodiment 2 of the present invention.
Figure 7:
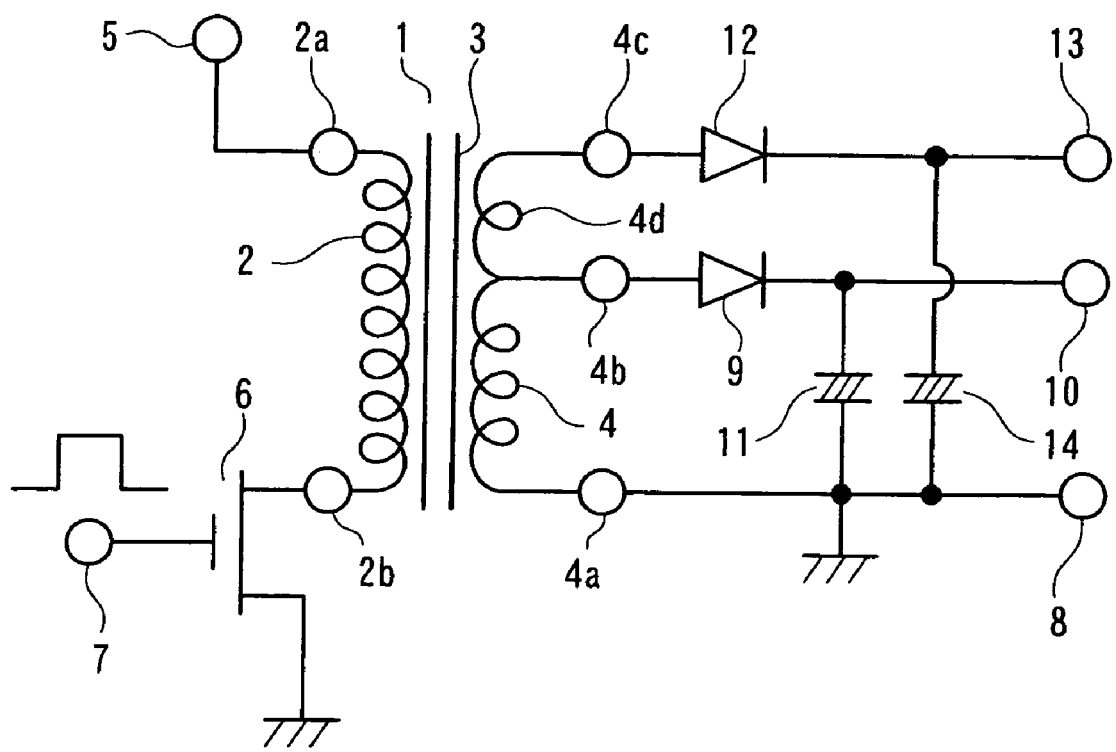
FIG. 7 is a circuit diagram showing a conventional switching power supply.
Figure 8:
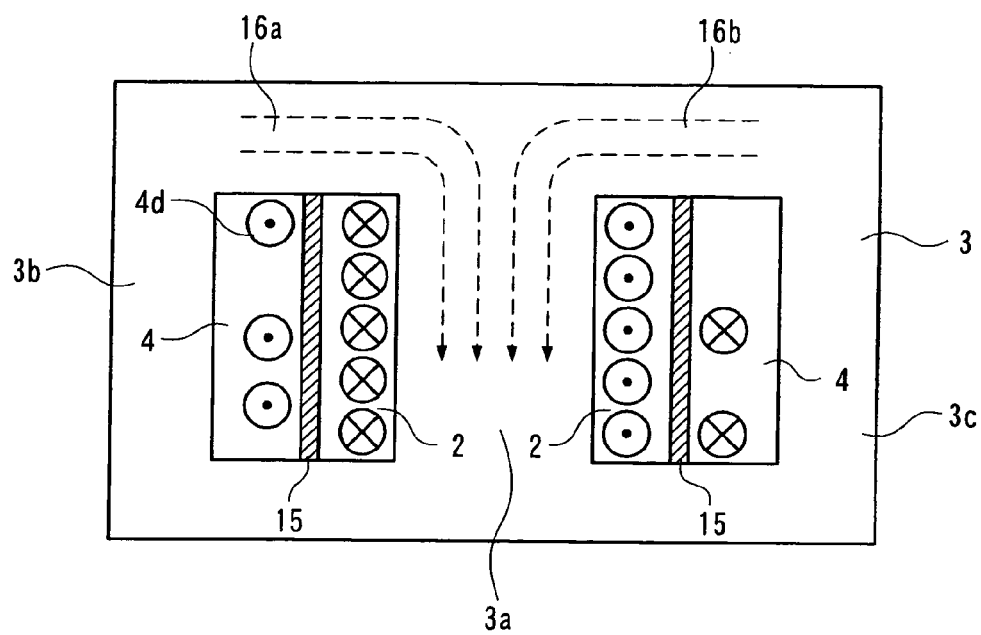
FIG. 8 is a sectional front view showing a conventional transformer for the switching power supply.
Figure 9:
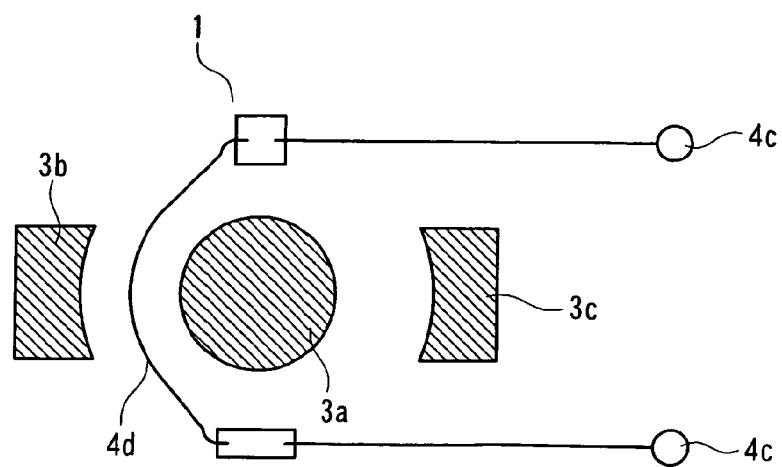
FIG. 9 is a sectional top plan view showing the main part of the conventional transformer for the switching power supply.

Referring to FIG. 6, Embodiment 2 will be discussed below. In Embodiment 2, a ⅓-turn winding is obtained. In other words, this technique can reduce the number of turns of a primary winding and a secondary winding to a third of the conventional art, thereby reducing the size and weight of a power supply transformer. Besides, voltage stability can be obtained as in a one-turn winding of the conventional art.

In FIG. 6, reference numeral 51 denotes a core formed of soft iron and reference numeral 51a denotes an inner core. Reference numeral 51b denotes an outer core connected in a ring to the inner core 51a. Reference numeral 51c denotes an outer core connected in a ring to the inner core 51a. Reference numeral 51d denotes an outer core connected similarly in a ring to the inner core 51a. The outer cores 51b, 51c, and 51d are arranged in positions which are divided equally from 360° into three (120°).

As in Embodiment 1, a primary winding is wound around the inner core 51a and a secondary winding is wound outside the primary winding via an insulator. Conversely, the primary winding may be wound outside the secondary winding. The following will only describe apart corresponding to the winding with a fractional number of turns between the terminal 24b and the terminal 24d of Embodiment 1. Other relationships are similar to those of Embodiment 1 and thus only different points will be discussed below.

The following will discuss the ⅓-turn winding. In FIG. 6, a secondary winding 52a passes between the inner core 51a and the outer core 51b. A secondary winding 52b passes between the inner core 51a and the outer core 51c. Similarly, a secondary winding 52c passes between the inner core 51a and the outer core 51d.

Outside the core 51, the start terminal of the secondary winding 52b connects the start terminal of the secondary winding 52c and the start terminal of the secondary winding 52a, and connects to a terminal 53b. The terminal 53b is equivalent to the terminal 24b of Embodiment 1.

Similarly, outside the core 51, the end terminal of the secondary winding 52a connects the end terminal of the secondary winding 52b and the end terminal of the secondary winding 52c, and connects to a terminal 53c. The terminal 53c is equivalent to the terminal 24c of Embodiment 1.

In this way, the ⅓-turn winding 52a passes between the inner core 51a and the outer core 51b and the winding 52b passes between the inner core 51a and the outer core 51c. The winding 52c passes between the inner core 51a and the outer core 51d. Further, the windings 52a, 52b, and 52c in the same direction are connected in parallel. Therefore, the windings equal in induced voltage are connected in parallel.

Thus, a voltage induced between the terminal 53b and the terminal 53c is equivalent to that of a ⅓-turn winding. A magnetic flux 54a between the inner core 51a and the outer core 51b, a magnetic flux 54b between the inner core 51a and the outer core 51c, and a magnetic flux 54c between the inner core 51a and the outer core 51d are made equal. Since the magnetic fluxes 54a, 54b, and 54c are kept in balance, an output improves in voltage regulation. Even when a one-turn winding (tripled) is used instead of the ⅓-turn winding, the magnetic fluxes 54a, 54b, and 54c can be kept in balance, thereby reducing a voltage regulation as in the present embodiment. However, in this case, the number of turns has to be tripled for the primary winding and the secondary winding. Therefore, the transformer increases in size and weight.

It is desirable that the outer cores 51b, 51c, and 51d be all identical in shape in cross section. With this configuration, all magnetic resistances are made equal and the output is stabilized against fluctuations in load.

Further, it is desirable that the cross-sectional area of the inner core 51a be equal to or larger than the sum of the cross-sectional area of the outer core 51b, the cross-sectional area of the outer core 51c, and the cross-sectional area of the outer core 51d. With this configuration, the inner core 51a and the outer cores 51b, 51c, 51d are made equal in magnetic flux density, so that the magnetic resistances are made equal and the output is stabilized against fluctuations in load.

(Embodiment 3)

Embodiment 3 is similar to Embodiment 1 or 2 even when a fractional number is not larger than a quarter. Generally, a secondary winding having a fractional number of 1/n can be explained by substituting n for 3 in Embodiment 2.

(Embodiment 4)

In Embodiment 4, a transformer 21 or the like with such a fractional number of turns is used for a switching power supply and is configured as shown in FIG. 2 of Embodiment 1. Therefore, the characteristics of the transformer 21 for a switching power supply can be applied as they are to the characteristics of the switching power supply.

The above explanation described an example of the transformer in which the primary winding and the secondary winding are wound inside and outside in a laminated manner. Embodiments 1 to 4 of the present invention can be directly applied to a transformer in which a primary winding and a secondary winding are wound in a divided manner.

What is claimed is:

1. A transformer for a switching power supply, the transformer comprising:
   an inner core,
   a plurality of outer cores connected in a ring to the inner core,
   a primary winding fed with a high frequency wave and wound a fractional number of times around the inner core, and
   a secondary winding wound a fractional number of times while being insulated from the primary winding, wherein the secondary winding has windings that pass at least once between the inner core and all of the respective outer cores, windings passed in a same direction are connected in parallel, and
   a pair of parallel windings wound around the inner core, the pair of parallel windings and the primary winding are connected to separate terminals.

2. The transformer for a switching power supply according to claim 1, wherein the plurality of outer cores is comprised of two outer cores, and the fractional number of times the primary and secondary windings are wound is one-half.

3. The transformer for a switching power supply according to claim 1, wherein the plurality of outer cores is comprised of three outer cores, the fractional number of times the primary and secondary windings are wound is one-third.

4. The transformer for a switching power supply according to claim 1, wherein the plurality of outer cores is comprised of n outer cores, the fractional number of times the primary and secondary windings are wound is $1/n$.

5. The transformer for a switching power supply according to claim 1, wherein the outer cores all have identical cross-sectional shapes.

6. The transformer for a switching power supply according to claim 1, wherein the inner core has a cross-sectional area equal to or larger than a sum of cross-sectional areas of all the outer cores.

7. The transformer for a switching power supply according to claim 1, wherein the transformer is used for a switching power supply.

8. The transformer for a switching power supply according to claim 1, wherein the secondary winding extends between a start terminal and an intermediate terminal, the pair of fractionally wound windings extend between the intermediate terminal and an end terminal.

* * * * *